United States Patent [19]

Mori

[11] Patent Number: 4,844,598
[45] Date of Patent: * Jul. 4, 1989

[54] LIGHT FOCUSING LENS WITH CENTRALLY DISPOSED LIGHT INTERCEPTING MEMBER

[76] Inventor: Kei Mori, 3-16-3-501, Kaminoge, Setagaya-ku, Tokyo, Japan

[*] Notice: The portion of the term of this patent subsequent to Mar. 31, 2004 has been disclaimed.

[21] Appl. No.: 767,554

[22] Filed: Aug. 20, 1985

[30] Foreign Application Priority Data

Aug. 31, 1984 [JP] Japan .................. 59-183292

[51] Int. Cl.⁴ ............................ G02B 3/08; F24J 2/08
[52] U.S. Cl. .................................. 350/409; 126/440; 250/216; 350/452
[58] Field of Search .............. 350/448, 409, 444, 440, 350/452; 126/440; 250/216

[56] References Cited

U.S. PATENT DOCUMENTS

| | | | |
|---|---|---|---|
| 3,035,489 | 5/1962 | Simons | 250/216 X |
| 3,763,372 | 10/1973 | Fedotowsky et al. | 250/216 X |
| 4,016,416 | 4/1977 | Shepherd, Jr. et al. | 250/216 X |
| 4,273,425 | 6/1981 | Cancek | 350/444 |
| 4,457,593 | 7/1984 | Yokota | 350/448 |
| 4,461,278 | 7/1984 | Mori | 126/440 |
| 4,653,472 | 3/1987 | Mori | 126/440 |

OTHER PUBLICATIONS

Mallery, Stephen; "Catching Some Rays: New Device Delivers Filtered Sunlight Indoors", Architectural Lighting; Oct. 1987.
"Himawari" brochure.

Primary Examiner—Bruce Y. Arnold
Assistant Examiner—Scott J. Sugarman
Attorney, Agent, or Firm—Jordan and Hamburg

[57] ABSTRACT

A lens for collecting solar rays or artificial light rays having light rays' component near to that of the solar rays. In particular, the lens capable of effectively separating and focusing only the light component of a desired wave length among the solar rays' components or the artificial light rays' components.

The lens has a light intercepting member on the central part thereof, and the circumferential part thereof is formed so as to perform a lens function.

11 Claims, 1 Drawing Sheet

LIGHT FOCUSING LENS WITH CENTRALLY DISPOSED LIGHT INTERCEPTING MEMBER

BACKGROUND OF THE INVENTION

The present invention relates to a lens for collecting solar rays or artificial light rays having light rays' component near to that of the solar rays, in particular, relates to a lens capable of effectively separating and focusing only the light component of a desired wave length among the solar rays' components or the artificial light rays' components.

The present applicant has previously proposed various ways to focus solar rays or artificial light rays by use of lenses or the like, to guide the same into an optical conductor, and thereby to transmit them onto an optional desired place through the optical conductor for use in illumination or for other like purposes.

However, in the case of employing the light energy transmitted through the optical conductor in such a manner as mentioned above as a photo-synthesis light source for nurturing chlorella or intensively cultivate the plants, a light source for breeding fish, a light source for promoting human health, and a light source utilized for various other purposes, there are many cases in which only a desired light component fitted in the purpose of utilization needs to be selectively separated and employed among the light components contained in the light energies.

However, although various techniques of cutting off infrared rays, ultraviolet rays, or the like have already been proposed up to now, a technique of taking out a light component of the specially designated wave length among the white light rays has not yet been proposed at all. Furthermore, it was very difficult to obtain the infrared rays, the ultraviolet rays, or the like which contain no visible light rays' component or very small amount of component of those visible rays.

SUMMARY OF THE INVENTION

The primary object of the present invention is to provide a lens capable of effectively taking out the light rays component of the desired wave length among the solar rays or the artificial light rays.

It is another object of the present invention to provide a lens having a light intercepting member on the central part thereof.

It is another object of the present invention to provide a lens in which the central part thereof is covered with a light intercepting member and the circumferential part thereof is formed so as to perform a lens function.

The above-mentioned features and other advantages of the present invention will be apparent from the following detailed description which goes with the accompanying drawings.

DESCRIPTION OF THE PREFERRED EMBODIMENTS

Figure 1:
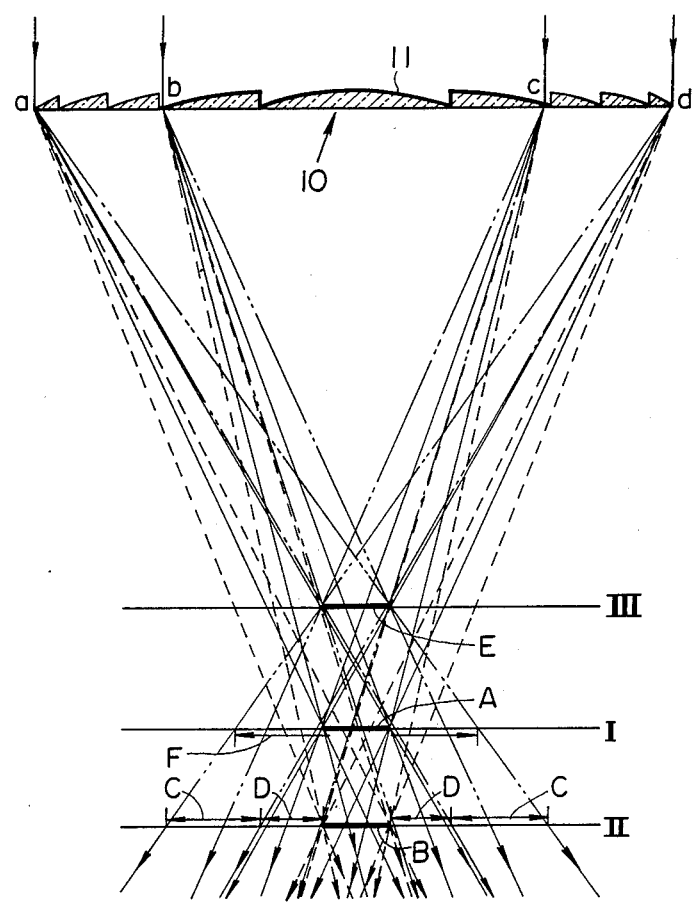
FIG. 1 is a construction view for explaining an embodiment of a light focusing lens according to the present invention.

FIG. 1 is a construction view for explaining an embodiment of the present invention. In FIG. 1, 10 is a Fresnel lens, and 11 is a light intercepting membrane mounted on the central portion of the Fresnel lens 11. The solar rays or the artificial light rays arrive directly at the points; a, b, c and d, of the lens 10 are focused, respectively, as shown in FIG. 1.

Moreover, in FIG. 1, the green light rays are shown by solid lines, the red light rays by dotted lines, and the blue light rays by two-dots-and-dash lines, respectively. Therefore, at the portion A of the plane I in FIG. 1 comparatively pure green light rays are concentrated, at the portion B of the plane II comparatively pure red light rays, and at the portion E of the plane III comparatively pure blue light rays. Consequently, if each light-receiving edge of the optical conductors is put at those portions; A, B and E, respectively, the light rays having only the desired light component can be guided into the optical conductor.

Moreover, on the plane II, the portion C is a blue light component area, and the portion D is a green light component area. It has been described, heretofore, that the light-receiving edge of the optical conductor is moved to the direction of the lens' optical axis so as to take out the light component of a desired wave length. However, the light component guided into the optical conductor can be also changed in accordance with the diameter of the optical conductor. For instance, if the diameter of the optical conductor is equal to F on the plane I, the visible light rays containing the light components from red to blue are guided into the optical conductor.

Figure 2:
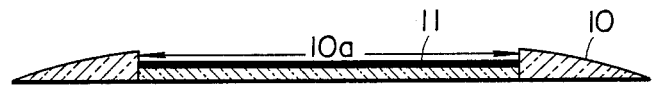
FIG. 2 is a cross-sectional view showing another embodiment of light focusing lens.

FIG. 2 is a cross-sectional view showing another embodiment of the light focusing lens according to the present invention. In the embodiment, a central portion 10a of the light focusing lens 10 is formed in a state of a plane surface and a light intercepting member 11 is put on the plane portion thereof.

Consequently, according to this embodiment, the plane portion 10a is formed at the same time when the lens is formed so that the dimension and location thereof can be determined precisely. And further, since the surface for mounting the light intercepting member thereon is plane, it will be very easy to form a light intercepting membrane 11.

Moreover, in the case of employing a reflector as the light intercepting member the lens is not heated at all. Consequently, there is less fear that the lens is not deformed due to the heat. It is very preferable. In case that there is no fear of being heated, the light intercepting member is not limited to the reflector. A light absorbing material, a photoelectric converter, or the like can be used instead of the reflector.

As is apparent from the foregoing description, according to the present invention, the light component of a desired wave length can be obtained by use of a comparatively simple construction. Furthermore, the square measure of the lens' central portion is smaller than that of its circumferential portion so that the light component of a desired wave length can be effectively obtained without losing the light energy to a large extent.

I claim:

1. A solar ray energy collecting device comprising light focusing lens for collecting solar light rays, said lens having a central portion and a peripheral portion, a light intercepting member disposed on said central portion such that said light rays are intercepted at said central portion of said lens by said light intercepting member, said peripheral portion of said lens focusing said light rays, an optical conductor for transmitting light rays to a desired location, said optical conductor having a light receiving edge spaced from said lens and disposed at a position which corresponds to the focus of one of the components of the focused light rays such that said optical conductor receives substantially only said one component of said focused light rays and transmits said one component to said desired location.

2. A solar ray energy collecting device according to claim 1, wherein said substantially only one component is a green light component.

3. A solar ray energy collecting device according to claim 1 wherein said substantially only one component is a red light component.

4. A solar ray energy collecting device according to claim 1 wherein said substantially only one component is a blue light component.

5. A solar ray energy collecting device according to claim 1 wherein said central portion of said lens has a flat surface on which said light intercepting member is disposed.

6. A solar ray energy collecting device according to claim 1 wherein said light intercepting member comprises light absorbing material.

7. A solar ray energy collecting device according to claim 1 wherein said light intercepting member comprises photoelectric converter means.

8. A solar ray energy collecting device according to claim 1 wherein said lens is a Fresnel lens.

9. A solar ray energy collecting device according to claim 1, wherein said light receiving edge is defined by one longitudinal end of an optical conductor, said optical conductor having a circular cross-sectional configuration such that said longitudinal end defines a circular area, said one component of said light rays being focused within said circular area.

10. A solar ray energy collecting device according to claim 1, wherein said lens has an outer side and an inner side with said inner side facing said light receiving edge, said outer side having a planar surface at said central portion, said light intercepting member being mounted on said planar surface.

11. A solar ray energy collecting device according to claim 1, wherein said central portion has an area less than the area of said peripheral portion.

* * * * *